Oct. 26, 1943.  Z. PEHEL  2,332,526
TREE FELLER
Filed Nov. 8, 1941  2 Sheets-Sheet 1
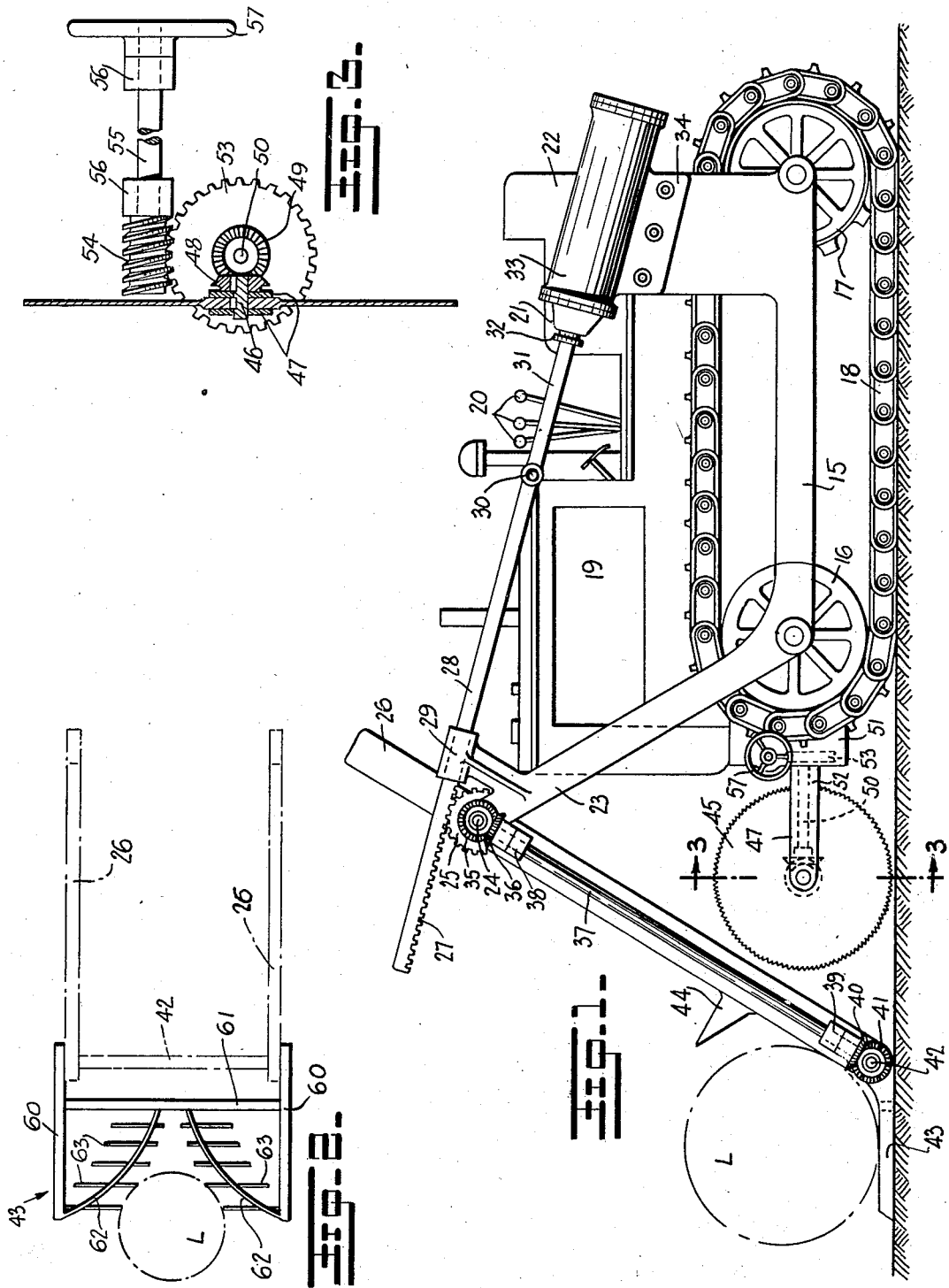
INVENTOR.
ZYGMUNT PEHEL.
BY
ATTORNEY.

Oct. 26, 1943.  Z. PEHEL  2,332,526
TREE FELLER
Filed Nov. 8, 1941  2 Sheets-Sheet 2
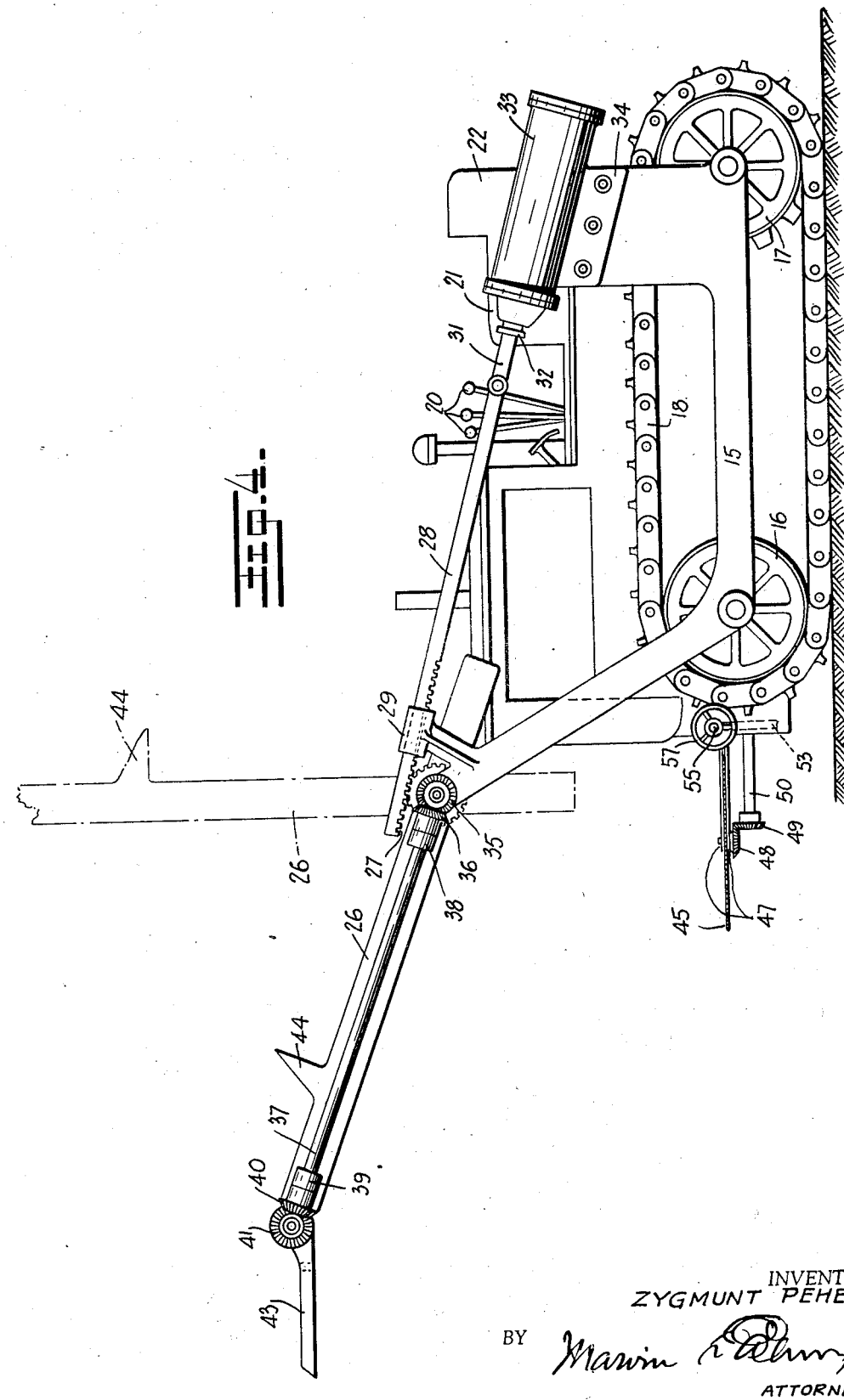
INVENTOR.
ZYGMUNT PEHEL.
BY
ATTORNEY.

UNITED STATES PATENT OFFICE 2,332,526

TREE FELLER

Zygmunt Pehel, Bronx, N. Y.

Application November 8, 1941, Serial No. 418,377

1 Claim. (Cl. 143—43)

This invention relates to de-forestation device for the use of armies, farms and the like where it is desired to clear the land of standing timber, as growing trees, and like utilitarian purposes.

In clearing land encumbered with trees the usual process is by chopping with an axe, by hard manual labor; thereafter it is often necessary to remove the stumps, by blasting and fire, and finally to remove the accumulated debris.

While on a farm labor may be cheap and inexpensive for such work, in the case of an advancing army trained sappers are employed and the time consumed may be of the utmost consequence.

Having these matters in mind, it is an object of the invention to provide a circular saw, that in one position cuts the trunk of the tree from its stump, and in another position may be used for splitting the trunk into readily removable fragments.

Another feature is in the provision of a tractor truck, wheeled power driven tank, or rugged vehicle of similar nature on which the saw is mounted to be driven at a speed commensurate with its size.

A further purpose is to provide means, combined with the tractor for raising the trunk of the tree and depositing it at will wherever it may be desired.

These and other valuable objects are accomplished by the novel and practical construction, combination and arrangement of parts hereinafter described and illustrated in the accompanying drawings, constituting a graphical component of this disclosure, and in which:

Figure 1 is a side elevational view of a complete embodiment of the invention, with the movable arm lowered and the saw on a horizontal axis, as in cutting the stump and trunk of a tree on the ground.

Figure 2 is a top plan view of the spring clamp for holding a tree in position for operation.

Figure 3 is a transverse sectional view taken on line 3—3 of Figure 1, drawn to an enlarged scale.

Figure 4 is a similar view to Figure 1 but showing the movable arm raised, and the saw mounted on a vertical axis.

Referring in greater detail to the drawings, the numeral 15 designates in general a tractor frame mounted on sprocket wheels 16 and 17, respectively front and rear, around which are trained tractor chains 18.

A motor is contained in the housing 19, connected in the usual manner with the rear drive wheels 17, and is provided with the usual controls, indicated generally at 20, convenient to a driver's seat 21 mounted in a raised, rear portion 22 of the frame 15.

At the front of the frame is a rigid, forwardly and upwardly extending oblique arm 23 having at its upper end a stub shaft 24, on which is rotatably mounted a spur gear 25, fixed to a movable arm 26 pivoted on the shaft 24.

Meshed with the gear 25 is a rack 27 formed on the end of a bar 28, slidable in a bearing 29 extending integrally from the rigid oblique frame arm 23.

The bar 28 is connected at 30 with a plunger 31 passing through a stuffing box 32 to a piston operative in a cylinder 33 mounted on a bracket 34 bolted at an angle on the rear portion 22 of the tractor frame.

The cylinder may be arranged to be operated pneumatically or hydraulically by means connected with the tractor motor or otherwise as preferred; obviously the motion of the piston, communicated by the rack 27 and gear 25 to the arm 26 will cause the arm to turn upon the pivot 24 into various angular positions, as indicated in Figure 4.

Also fixed on the pivot 24 is a bevel gear 35, meshed with a mating gear 36 fixed on the end of a shaft 37 mounted in bearings 38 and 39 carried on the arm 26.

The lower end of the shaft 37 carries a bevel gear 40, meshed with a mating gear 41 fixed on the end of a stub shaft 42 set in a movable hand 43 adapted to move along over the surface of the ground and under a log L, indicated in broken lines.

A spur 44 reaches outwardly from the front edge of the arm 26, the device showing in unloading position in Figure 1.

A circular saw 45, of such diameter as may be required, is keyed to a spindle 46 between flanges 47; also keyed to the spindle 46 is a bevel gear 48 meshed with a mating gear 49, driven by a shaft 50, in turn driven by an independent motor enclosed in a housing 51, carried by the tractor.

The shaft 50 is journalled in a bearing 52 and is fixed on the side of a worm gear 53, meshed with a worm 54 fixed on a shaft 55, mounted in bearings 56 and rotatable by a hand-wheel 57.

From the foregoing it will be seen that the saw 45 may be manually moved into position to operate either horizontally or perpendicularly by the hand-wheel 57 at will.

As shown in Figure 2, the tractor side frames 15 may have pivoted to them, at their front ends, an independent frame 60 having a brace bar 61 to which the inner, rear ends of arcuate springs 62 are attached, their outer ends being attached to the ends of the frame sides 60.

Carried by the opposed arcuate springs 62 are a plurality of short straight spring rods 63 adapted to engage the surface of a tree trunk as indicated, tending to maintain it in position to be operated upon by the saw.

It will be apparent that a chain or rake, and drum may be substituted for the bar 31 and cylinder 33 if preferred.

Having thus described the invention, and set forth the manner of its construction and operation, what is claimed as new and sought to secure by Letters Patent, is:

In a portable tree felling device provided with a tree cutting tool, means for securing the device rigidly to the tree so that said tool may act upon the tree and to prevent the tree and tool from separating during said action, said means comprising spaced lateral frame members extending forward from the device and a horizontal cross member positioned near the rearward ends of said frame members, a pair of rearwardly convergent arcuate spring members secured at their forward ends to said frame members and at their rearward ends to said cross member, each of said spring members having rigid thereon a plurality of spaced horizontal spring fingers extending a short distance to either side of the spring member on which they are rigid, the device being adapted to be moved against the tree with the tree registering in the space between the said spring fingers of the said spring members and being gripped thereby.

ZYGMUNT PEHEL.